Patented Aug. 16, 1932

1,872,588

UNITED STATES PATENT OFFICE

PAUL R. HINES, OF PARMA VILLAGE, OHIO, ASSIGNOR TO THE HARSHAW CHEMICAL COMPANY, OF CLEVELAND, OHIO, A CORPORATION OF OHIO

MANUFACTURE OF CHROMIUM TRIOXIDE

No Drawing.   Application filed April 15, 1929.   Serial No. 355,438.

It has long been customary to make chromium trioxide, commonly called chromic acid, by heating sodium bichromate containing water of crystallization with sulphuric acid. The process is tedious, requiring several hours for completion, and difficulties are prone to occur from the formation of lumps, rendering the heating irregular; and more or less decomposition of the product formed is inevitable. Procedure making possible a quick and efficient reaction, with minimization of losses is accordingly of fundamental importance and highly desirable.

To the accomplishment of the foregoing and related ends, the invention, then, consists of the features hereinafter fully described, and particularly pointed out in the claims, the following description setting forth in detail certain illustrative embodiments of the invention, these being exemplary however of but a few of the various ways in which the principle of the invention may be employed.

In proceeding in accordance with my invention, acid containing little or no water is mixed with an alkali metal chromate or bichromate; and by employing sulphuric acid of not less than 98 per cent., or better fuming sulphuric acid or oleum, the amount of water introduced may be kept to a minimum. It is preferable also to employ an anhydrous chromate or bichromate, the avoidance of introduction of water or crystalline salts being further favorable and eliminating necessity of providing a corresponding amount of external heat. By suitable choice of conditions, a reaction may be had of exothermic type, and fused products are directly formed, it being merely necessary to then separate the chromium trioxide in its fused condition, and the entire procedure requires such a small time factor as to be conducive to continuous type of operation. To an extent, where some water is carried in the chromate or dichromate initially employed, the strength of the acid may be raised to compensate, and vice versa. Under certain conditions some external heat may then be required, in accordance with the water present; but it is preferable that reaction be in as nearly anhydrous condition as possible so far as the reagents are concerned.

As an illustrative example, anhydrous bichromate of soda is supplied to a reaction vessel, and 20 per cent. oleum is simultaneously fed, proportions being for instance about 262 parts of the bichromate and 187 parts of the oleum, both by weight, and with agitation feed of the reagents may be maintained in a continuous manner in calibrated streams from the bichromate supply and the oleum supply vessel. Vigorous reaction sets in and the temperature rises high enough to melt both the chromium trioxide and the sodium bisulphate formed. In starting up, it is desirable to initially heat the reaction vessel up to a temperature of 180-210°, or preferably 193-195° C., in order to avoid wastage of heat otherwise from the reaction. With a reaction vessel having some heating means, the amount of heat so desired may be readily provided; and then with the reaction established, the reaction mass may provide its own requirements, and the temperature may be controlled by the rate of feed of the reacting materials, the acid feed rate particularly affording convenient control. The products formed flow out from the reaction vessel to a layer-separating means, for instance a container allowing stratification. The temperature of the molten mass thus being continued such as to permit separation, the molten mixture is separated, the sodium bisulphate being drawn off in one stream in a continuous manner to a suitable point of disposal, while the heavier molten chromium trioxide is drawn off as another stream. At this point, the latter is desirably reduced to a finely divided state, and this may be feasibly accomplished by atomization, or by flowing onto the cooled surface of a drum or belt where it quickly solidifies as a film, and with the travel of the drum or belt proceeds against a knife which flakes the material off and drops it down to a suitable receiver.

Where the chromate or bichromate contains more or less moisture, it is desirable to remove the same to a greater or less extent before entry into the reaction vessel, and this may be accomplished by passing through a suitable heating zone. With this, more or less heat as desired may be applied to the chromate or bichromate, as it is forwarded to the reaction vessel.

It will thus be seen that the difficulties incident to the old type of process are avoided, and the advantages of the invention may be had in various degree, the most desirable condition involving sufficient exothermic heat generated in the mass itself to afford desired molten products, while where less than such heat is had it may be supplemented by external heat; and correspondingly more or less completely anhydrous materials may be employed. While molecular proportions of the reaction components are desirable, considerable variation therefrom is permissible, and the acid may be in deficient or excessive amount without interfering with the reaction, but if a considerable excess of acid be employed it is necessary to watch the temperature more carefully to avoid decomposition of the product formed, and in general, operating temperatures ought not to exceed 215° C., the desirable range being 193–210° C. Also, the strength of the acid may be varied, and although oleum or fuming sulphuric acid having a free $SO_3$ content as high as 100 per cent. may be employed, practically an oleum having a free $SO_3$ content up to 50 or 60 per cent. is used, and commercially it is ordinarily preferable to employ oleum of free $SO_3$ content of 10—30 per cent., such most feasibly providing conditions requisite for efficient handling of the chromate or bichromate, and facilitating a smoothly operating continuous procedure.

Other modes of applying the principle of the invention may be employed, change being made as regards the details disclosed, provided the features stated in any of the following claims, or the equivalent of such, be employed.

I therefore particularly point out and distinctly claim as my invention:

1. A process of making chromium trioxide, which comprises reacting between sulphuric acid and an alkali metal compound of chromic acid, both said acid and compound being in approximately anhydrous condition.

2. A process of making chromium trioxide, which comprises reacting between fuming sulphuric acid and an alkali metal compound of chromic acid, the moisture content of said compound being proportioned to the $SO_3$ content of the acid such that approximately anhydrous conditions are effected.

3. A process of making chromium trioxide, which comprises reacting upon about 262 parts of substantially anhydrous sodium bichromate with about 187 parts of fuming sulphuric acid of 20 per cent. free $SO_3$ content.

4. A process of making chromium trioxide, which comprises continuously mixing anhydrous sulphuric acid and approximately anhydrous alkali metal compound of chromic acid to form molten products, while regulating the temperature by the rate of addition of the raw materials.

5. A process of making chromium trioxide, which comprises mixing a substantially anhydrous sulphuric acid and an alkali metal compound of chromic acid in substantially anhydrous condition, to form molten products, and separating the chromium trioxide therefrom.

6. A process of making chromium trioxide, which comprises reacting between anhydrous sodium bichromate and fuming sulphuric acid having a 10 to 30 per cent. free $SO_3$ content.

Signed by me this 10th day of April, 1929.

PAUL R. HINES.